United States Patent [19]

Shkolnik et al.

[11] 4,446,628

[45] May 8, 1984

[54] DEVICE FOR DETERMINING ANGLE OF INCLINATION OF SHIP

[76] Inventors: David Shkolnik, 62-42 Woodhaven Blvd., Rego Park, N.Y. 11374; Alla Slonimsky, 1402 Ventura Way, Newport News, Va. 23602

[21] Appl. No.: 422,279

[22] Filed: Sep. 16, 1982

[51] Int. Cl.³ .............................................. G01C 9/06
[52] U.S. Cl. ...................................... 33/366; 33/363 L; 33/391
[58] Field of Search ................... 33/366, 363 R, 363 L, 33/363 K, 363 Q, 391, 333, 312; 200/52 A, 61.45 R, 61.52

[56] References Cited

U.S. PATENT DOCUMENTS

| | | | |
|---|---|---|---|
| 978,942 | 12/1910 | Schuette et al. | 33/363 L |
| 2,309,877 | 2/1943 | Weinstein et al. | 33/312 |
| 2,893,134 | 7/1959 | Shea et al. | 33/366 |
| 3,985,033 | 10/1976 | Ford | 33/366 |

Primary Examiner—Willis Little
Attorney, Agent, or Firm—Ilya Zborovsky

[57] ABSTRACT

A device for determining an angle of inclination of a ship has a curved guiding member fixedly connected with the ship and inclinable together with the latter, a rolling member arranged to roll on said guiding member in response to inclination of the ship and thereby inclination of said curved guiding member between a plurality of positions, and a recorder for recording the angle of inclination of the ship and operative in dependence upon a position of said rolling member on said curved guiding member.

3 Claims, 1 Drawing Figure

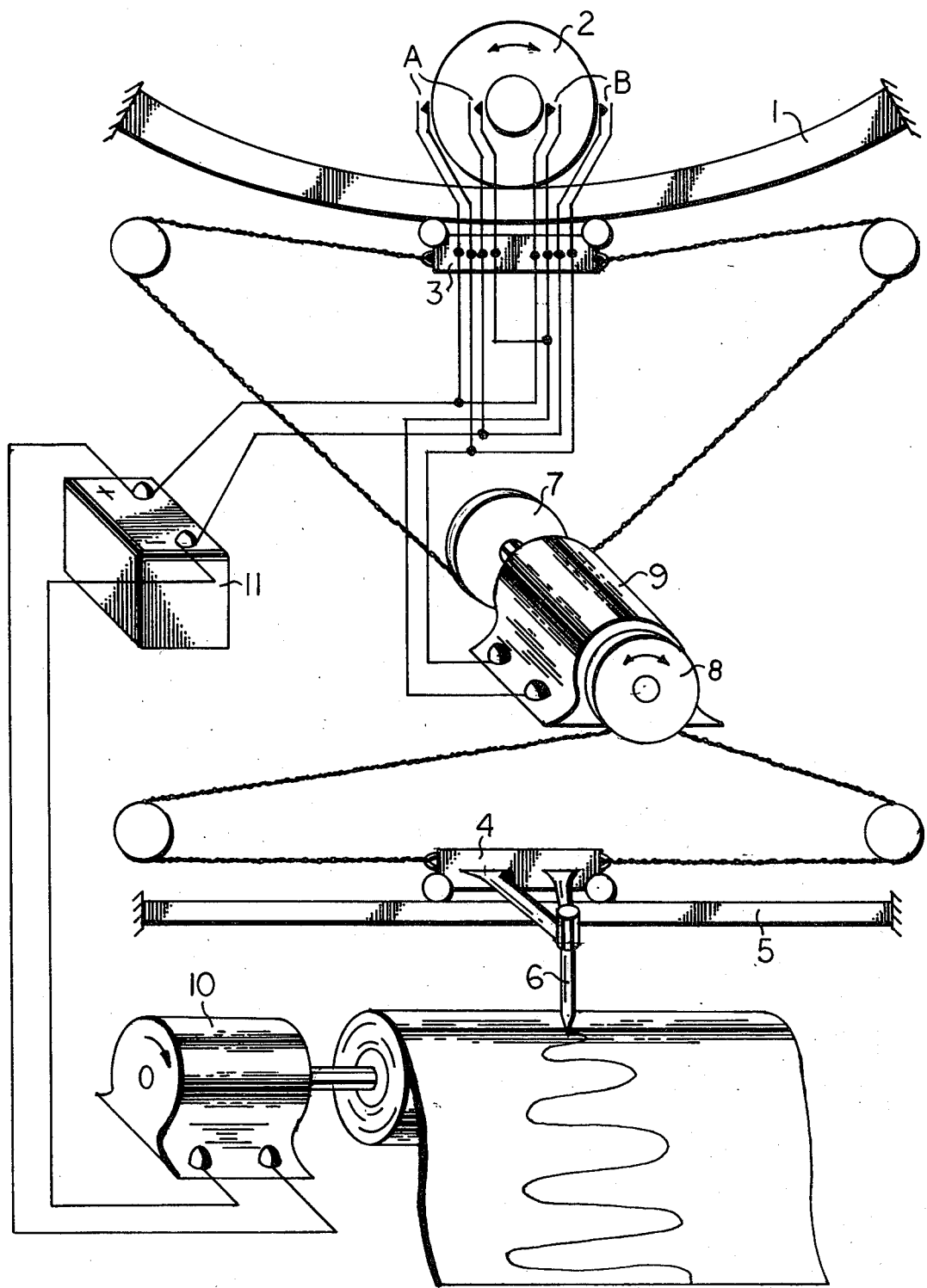

DEVICE FOR DETERMINING ANGLE OF INCLINATION OF SHIP

BACKGROUND OF THE INVENTION

The present invention relates to a device for determining and recording angles of inclination of a ship.

Devices of the above mentioned general type are known in the art. One of such devices is an inclinograph of Amaev invented in the USSR. This device includes a massive pendulum which is suspended on an axle fixedly connected with the ship. When the ship inclines, the pendulum remains immovable in space and drives a recorder, through a system of levers, to record the angle of inclination of the ship. The main disadvantage of this device is a small length of the pendulum and high errors connected with accuracy losses in the kinematic chain of the levers, which change the scale of the measured value of the angle of inclination. With the practically acceptable dimensions of the device, the length of the pendulum cannot exceed 0.4–0.5 m, while the elevation of an imaginary axis about which swinging of the ship takes place (methacentric height) and which is determined from the readings of the device can be 10–15 m.

SUMMARY OF THE INVENTION

Accordingly, it is an object of the present invention to provide a device for determining an angle of inclination of a ship, which avoids the disadvantages of the prior art.

More particularly, it is an object of the present invention to provide a device for determining an angle of inclination of a ship which actually uses a pendulum of a limitless length and therefore has an increased accuracy, and eliminates a system of levers for scaling and therefore avoids errors connected with the latter.

In keeping with these objects and with others which will become apparent hereinafter, one feature of the present invention resides, briefly stated, in a device for determining an angle of inclination which has a curved member fixedly connected and inclinable with a ship, and a rolling member which rolls over the curved member during inclining of the ship and the curved member and thereby controls a dispacement of a recorder. The curved member has an arbitrary radius which is a length of an imaginary pendulum. A pendulum body is formed by the rolling member which assumes a lowest position on the curved member under the action of a gravity force. Increase or reduction of a scale is carried out by increasing or reducing of the radius of the curved member, which is limited only technologically.

The novel features of the present invention are set forth in particular in the appended claims. The invention itself, however, both as to its construction and to its manner of operation will be best understood from the following description of a preferred embodiment which is accompanied by the following drawing.

BRIEF DESCRIPTION OF THE DRAWING

The single FIGURE of the drawing is a view showing a device for determining an angle of inclination of a ship in accordance with the present invention.

DESCRIPTION OF A PREFERRED EMBODIMENT

A device for determination and recording of an inclination angle of a ship has a curved member identified by reference numeral 1 and fixedly attached to the ship. The curved member 1 is a support or guide which is curved in accordance with an arbitrary radius, and its radius is a radius of an imaginary pendulum.

The device further includes a rolling body 2 which forms a body of the pendulum assuming a lowest position on an arc of the curved member 1 under the action of a gravity force. There are further two groups of contacts identified by reference letters A and B and referred to further herein as a left group of contacts and a right group of contacts. The contacts of the groups A and B are arranged in a circuit of an electric motor 9.

The shaft of the electric motor 9 carries a pulley 7 connected via a chain or the like with further pulleys and a carriage of the contacts of the groups A and B. The other end of the shaft of the electric motor 9 carries a pulley 8 which is connected via a chain or the like with a carriage 4 of a recorder such as a chart recorder 6. The electric motor 9 is an electric motor of a direct current, which changes its direction of rotation in response to change of a polarity in a supply circuit.

A paper supply motor 10 rotates a core of a paper roll and provides for a supply of a paper. A current source is identified by reference numeral 11 and is connected with the electric motor 9 for displacing the carriage 3 of the contacts, on the one hand, and with the paper displacing motor 10, on the other hand.

The device in accordance with the present invention operates in the following manner:

When a ship inclines for example to the left, the curved member connected with the ship is also inclined to the left. The rolling body 2 (a roller, a ball and the like) rolls to the left under the action of a gravity force and closes the contacts of the left group A. The thus formed electric circuit supplies current from the current source 11 to the electric motor 9 which displaces the carriage 3 of the contacts and the carriage 4 of the recorder to the left so that the recorder 6 displaces on its guide 5 and records data corresponding to the thus taking place inclination of the ship. The displacement of the carriage 3 of the contacts takes place until the contacts of the group A open, the circuit is broken and the electric motor 9 stops. The carriage 3 under the action of inertia passes a neutral position corresponding to opening of all contacts of the groups A and B and closes the contacts of the right group B. As a result of this, polarity of the current in the circuit changes and the electric motor 9 changes its direction of rotation and thereby displaces the carriage 3 of the contacts and the carriage 4 of the recorder to the right. This cycle is repeated to the moment of complete damping of oscillations in the system the rolling body—the contact groups, which corresponds to fixation of the angle on inclination of the ship. All displacements of the curved member and thereby of the ship are recorded by the recorder on the paper as a function of time, which is easy to process and interpret.

It is to be understood that the connection of the electric motor with the rolling body can be carried out in a different way. For example, during rolling of the rolling body over the curved member the rolling body can pass light barriers which in this case (in closed condition) close the circuit of the electric motor. The rolling body must be capable of closing the contacts.

The invention is not limited to the details shown since various modifications and structural changes are possible without departing in any way from the spirit of the present invention.

What is desired to be protected by Letters Patent is set forth in particular in the appended claims:

1. A device for determining an angle of inclination of a ship, comprising
    a curved guiding member fixedly connected with a ship and inclinable together with the latter; member in response to inclination of the ship and thereby inclination of said curved guiding member between a plurality of positions;
    means for recording an angle of inclination of the ship and operative in dependence upon a position of said rolling member on said curved guiding member, said recording means including a data carrier, a recorder arranged to record the angle of inclination on said data carrier, an electric motor arranged to displace said recorder and having an electric circuit, and a plurality of electric contacts in said electric circuit arranged so that during rolling of said rolling member and said contacts are closed by the latter and thereby said electric motor is energized and displaces saod recorder; and
    a carriage on which said electric contacts are arranged and which is displaceable together with said contacts by said electric motor relative to said curved guiding member substantially following the rolling of said rolling member on said curved guiding member.

2. A device as defined in claim 1, wherein said electric contacts include a first group of contacts located at one side of a vertical, and a second group of contacts located at the other side of the vertical, so that during rolling of said rolling body in each of two opposite directions transverse to the vertical said rolling body closes the contacts of a respective one of said groups.

3. A device as defined in claim 1; and further comprising a further electric motor arranged to supply said data carrier, and a electric source connected both with said first mentioned electric motor and with said further electric motor.

* * * * *